(12) United States Patent
Kiani et al.

(10) Patent No.: US 7,290,941 B2
(45) Date of Patent: Nov. 6, 2007

(54) MODULAR FIBER OPTIC CONNECTOR SYSTEM

(75) Inventors: Sepehr Kiani, Watertown, MA (US); Richard F. Roth, Brookline, NH (US)

(73) Assignee: Amphenol Corporation, Wallingford, CT (US)

( * ) Notice: Subject to any disclaimer, the term of this patent is extended or adjusted under 35 U.S.C. 154(b) by 149 days.

(21) Appl. No.: 10/744,050

(22) Filed: Dec. 23, 2003

(65) Prior Publication Data
US 2005/0135755 A1   Jun. 23, 2005

(51) Int. Cl.
G02B 6/36   (2006.01)
(52) U.S. Cl. ............................. 385/78; 385/84
(58) Field of Classification Search ............ 385/59, 385/60, 62, 66, 70–72
See application file for complete search history.

(56) References Cited

U.S. PATENT DOCUMENTS

| | | | |
|---|---|---|---|
| 5,408,557 A * | 4/1995 | Hsu | 385/72 |
| 5,563,978 A * | 10/1996 | Kawahara et al. | 385/136 |
| 5,796,894 A * | 8/1998 | Csipkes et al. | 385/56 |
| 6,371,660 B1 * | 4/2002 | Roehrs et al. | 385/59 |
| 6,456,774 B1 * | 9/2002 | Lin | 385/140 |
| 6,715,930 B2 * | 4/2004 | McBride | 385/73 |
| 6,776,645 B2 | 8/2004 | Roth et al. | |
| 6,832,858 B2 | 12/2004 | Roth et al. | |
| 2003/0044127 A1 | 3/2003 | Roth et al. | |
| 2005/0135752 A1 | 6/2005 | Kiani et al. | |

* cited by examiner

*Primary Examiner*—Sung Pak
*Assistant Examiner*—Omar Rojas
(74) *Attorney, Agent, or Firm*—Blank Rome LLP

(57) ABSTRACT

An optical fiber interconnection system with a small number of modular components that can be configured for simple construction in many configurations. The system includes connector housings. Optical fibers are installed into the housings on ferrule carriers. The housings are brought together in adapters. Different styles of adapters are available for different applications, such as panel or backplane configurations. However, the same housing and ferrule carriers can be used in any style of adapter. Also, different ferrule carriers are provided for single fiber ferrules and multi-fiber ferrules. Either style of ferrule carrier can be used in a housing and adapter. A ferrule carrier for single fiber ferrules can be modified to provide fine alignment features with the addition of a cap, allowing the same style ferrule carrier to be used in both halves of a mated connector assembly.

19 Claims, 8 Drawing Sheets

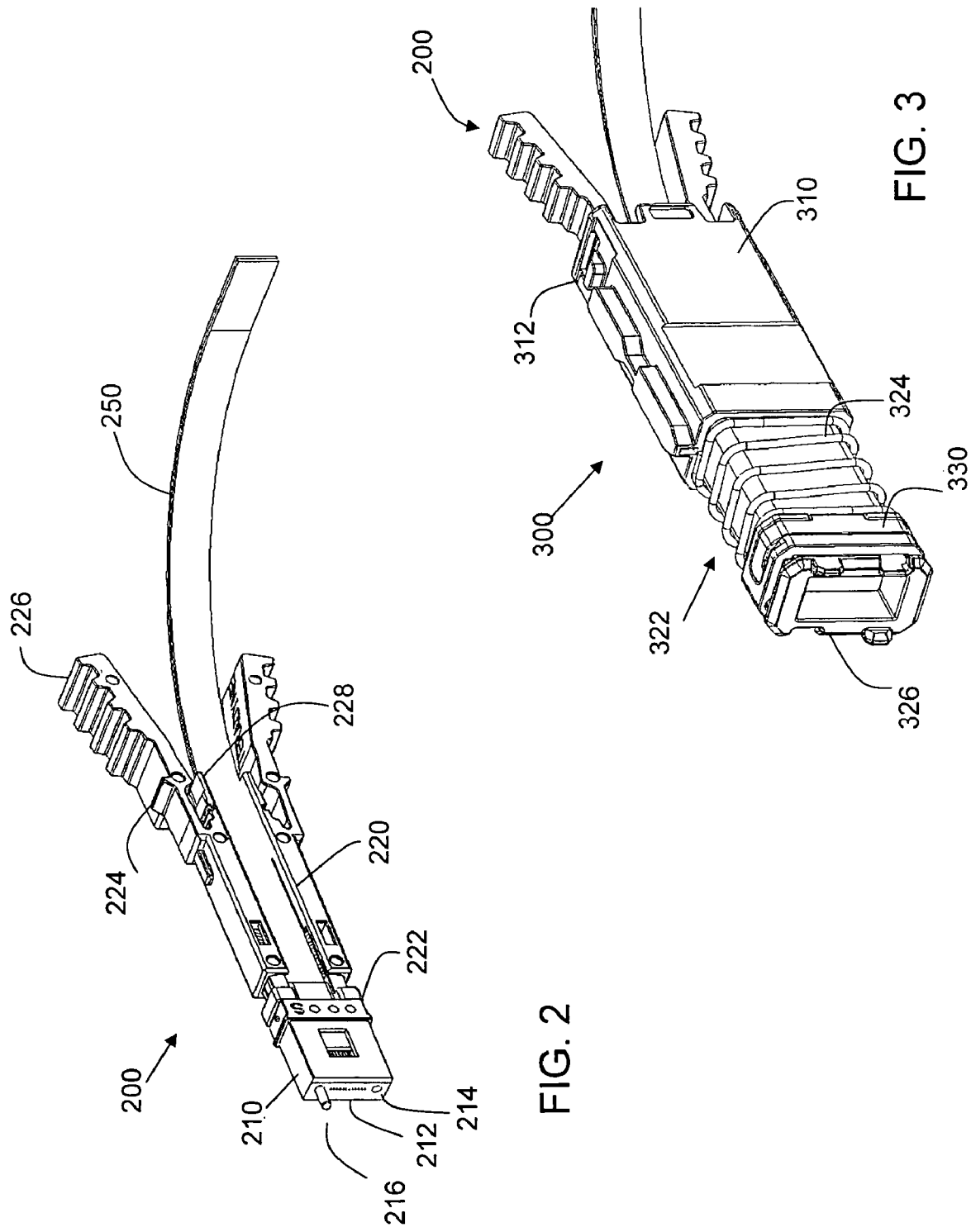

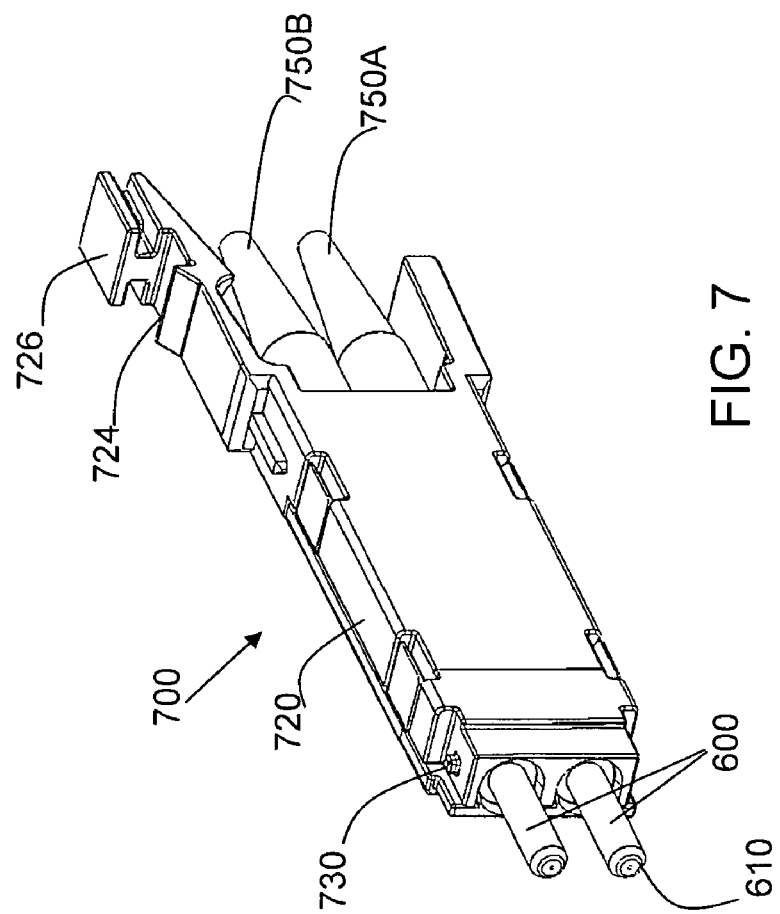
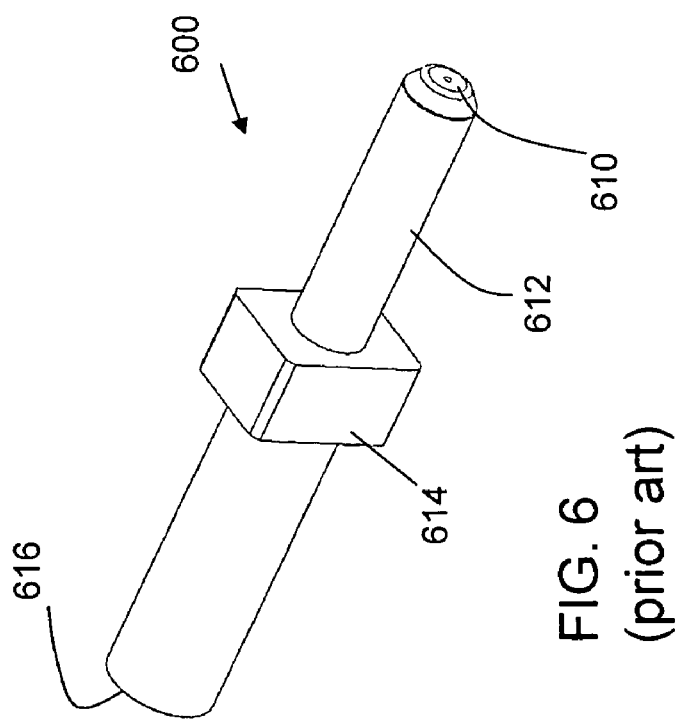
FIG. 7
FIG. 6 (prior art)

MODULAR FIBER OPTIC CONNECTOR SYSTEM

BACKGROUND OF INVENTION

1. Field of Invention

This invention relates generally to electronic systems and more specifically to electronic systems using optical fibers to carry data between components of the system.

2. Discussion of Related Art

Many types of electronic systems are known. Common examples of electronic systems are computers, routers and telecommunications switches. Complex electronic systems have long been built as subassemblies that are then integrated into an overall system. Integration requires that data be passed between subassemblies.

Traditionally, integration of subassemblies has included making connections for electrical signals to carry data between the subassemblies. In some systems, printed circuit boards, sometimes called backplanes, are used to carry electrical signals between subassemblies. Backplanes are usually built as printed circuit boards. Conductive traces within the board carry electrical signals and electrical connectors attached to the board allow subassemblies to be connected to those traces.

In some instances, subassemblies are also built on printed circuit boards, called daughter cards. The conductive traces on the daughter cards interconnect electronic components mounted on the board. The traces also connect those components to connectors on the daughter card. The daughter card connectors mate with backplane connectors to allow the electronic circuitry on the daughter card to pass information in the form of electrical signals through the backplane to other subassemblies connected to the backplane. Where interconnections are made through a backplane, all of the subassemblies to be connected together are usually mounted in one housing.

In other instances, some electronic systems are made up of subassemblies that are contained in separate housings. The system might be too big to fit in a single enclosure or might require subassemblies located in physically separate locations. For example, data storage farms are made of interconnected storage units because it is likely that one unit containing all the necessary circuitry would be too large to easily fit within a single housing. Routers and switches in networks are made as separate pieces to allow the network to span a wide geographic range. A system also might be manufactured as separate components as a matter of convenience. For example, a system might be made from modules to allow systems of many different sizes to be constructed by integrating different numbers of modules.

Where systems are assembled from separate components, cables are often used to interconnect the components. Electronic components that are intended to be integrated into a much larger system often have "panels" or "bulkheads" to which cables interconnecting the subsystems can be connected.

Often, the panel on a subassembly contains electrical connectors. Inside the subassembly, these connectors might be connected to backplanes or daughter cards or otherwise tied into the system. On the outside of the subassembly, the connectors are shaped to receive connectors on the ends of cables. In this way, cables can be plugged into panels to interconnect the subassemblies.

As electronic systems became more powerful, the data rate between subassemblies increased. To carry more data, optical interconnections were often used. Rather than transmit data as electrical signals on conductors, optical interconnections transmit data as modulated light in a structure that acts as an optical waveguide—often an optical fiber. To facilitate the interconnection of subassemblies using optical fibers, optical connectors have been developed. Both backplane/daughtercard and panel type optical connectors are known.

Several problems exist with optical interconnections that do not exist with corresponding electrical connectors. One particular problem is that the optical fibers must be aligned with much higher precision than electrical conductors for optical connectors to reliably transmit signals.

Alignment in optical connectors is often achieved through the use of several levels of alignment mechanisms. At the most precise level, the fiber in both halves of the connector is held in ferrules. Ferrules are precision manufactured components that contain alignment features.

Early designs used single fiber ferrules. These ferrules are generally cylindrical, with the outer surface of the cylinder being the alignment feature. Alignment of the fibers was achieved by inserting the ferrules into opposite ends of a sleeve. The sleeve was also a precision component, ensuring that the faces of the ferrules would align inside the sleeve. Often, the sleeve was incorporated into an adapter and connectors holding the ferrules were plugged into both sides of the adapter.

Multi-fiber ferrules have also been developed, such as the MT ferrule. Alignment features in these ferrules include posts and holes. The fibers held in the ferrules are aligned when the posts of one ferrule are in the holes of another ferrule.

However, for the ferrules to align the fibers as two connectors are mated, the ferrules must first be aligned such that the posts engage with the holes. This level of alignment is often provided through a connector housing. The connector housings have features that, when interlocked, ensure that the ferrules will be aligned with sufficient precision.

Another level of alignment is often used to ensure the housings line up and also to hold the connectors together when mated. A device that provides this level of alignment is also called an adapter. In a simple form, an adapter can be a sleeve into which two connectors can be inserted from opposite directions. The sleeve forces the connector housings into alignment when they come together in the center of the sleeve. Latching features can be incorporated into the sleeve to hold the connector housings together.

An example of an optical connector system can be found in U.S. patent application Ser. No. 10/243,458, filed Sep. 13, 2002, entitled Techniques for Forming Fiber Optic Connections in an Modularized Manner, now U.S. Pat. No. 6,832,858; U.S. Patent Application 2003/0044127 filed Jul. 16, 2002 entitled Modular Fiber Optic Connection System; U.S. patent application Ser. No. 10/326,480 entitled Latch and Release System for a Connector, filed on Dec. 20, 2002, by Roth, et al., now U.S. Pat. No. 6,776,645, all of which are hereby incorporated by reference in their entireties.

The above referenced patents and applications describe optical interconnection systems that use multi-fiber ferrules, housings and adapters for alignment. The adapters used for the backplane/daughter card interconnection in some of the examples have several sleeves tied together in a row. Though ferrules that can simultaneously align multiple fibers are known, forming several housings into a connector assembly allows even more connections to be made simultaneously for applications that require many connections.

Despite the development of multi-fiber ferrules, single fiber ferrules are still in use. Not all electronic systems require large numbers of optical fiber interconnects to be made at one time. A particular system simply might not require an exchange of a sufficiently large amount of data to justify a multi-fiber interconnect. And, single fiber interconnects often have different performance characteristics than multi-fiber interconnects. Single fiber connectors are more likely to be made with multimode fiber, which is larger than single mode fiber traditionally used in multi-fiber interconnects. Multimode fibers tend to exhibit less loss at mating interfaces than smaller single mode fibers.

For this reason, it will sometimes be preferable to create a connector with multiple single fibers for ferrules than to use one multifiber ferrule. There are tradeoffs between use of single fiber interconnection and multi-fiber interconnections, making some types more suitable for certain applications and others more suitable for other applications. Consequently, suppliers of optical fiber interconnection systems are required to stock or build many types of components to be able to meet the needs for any particular system.

We have recognized a significant advantage can be obtained by providing components of an optical interconnection system that can be flexibly assembled into many different configurations.

SUMMARY OF INVENTION

It is an object to provide an optical interconnection system that can be flexibly assembled into multiple configurations.

The foregoing and other objects are achieved in an optical interconnection system that employs a ferrule carrier inserted in a housing. In one embodiment, the housing can receive different types of ferrule carriers, with ferrule carriers adapted to hold ferrules that align either single fibers or multiple fibers.

In another embodiment, a ferrule carrier adapted to hold ferrules for aligning single fibers can be modified by the addition of an adapter member to allow two ferrule carriers of the same design to be aligned.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 2 is a sketch of a ferrule carrier holding the multi-fiber ferrule;

FIG. 3 is a sketch of the multi-fiber ferrule carrier of FIG. 2 in a housing;

FIG. 6 is a sketch of a prior art single fiber ferrule;

FIG. 7 is a sketch of a ferrule carrier holding two single fiber ferrules as shown in FIG. 6;

DETAILED DESCRIPTION

Figure 1:
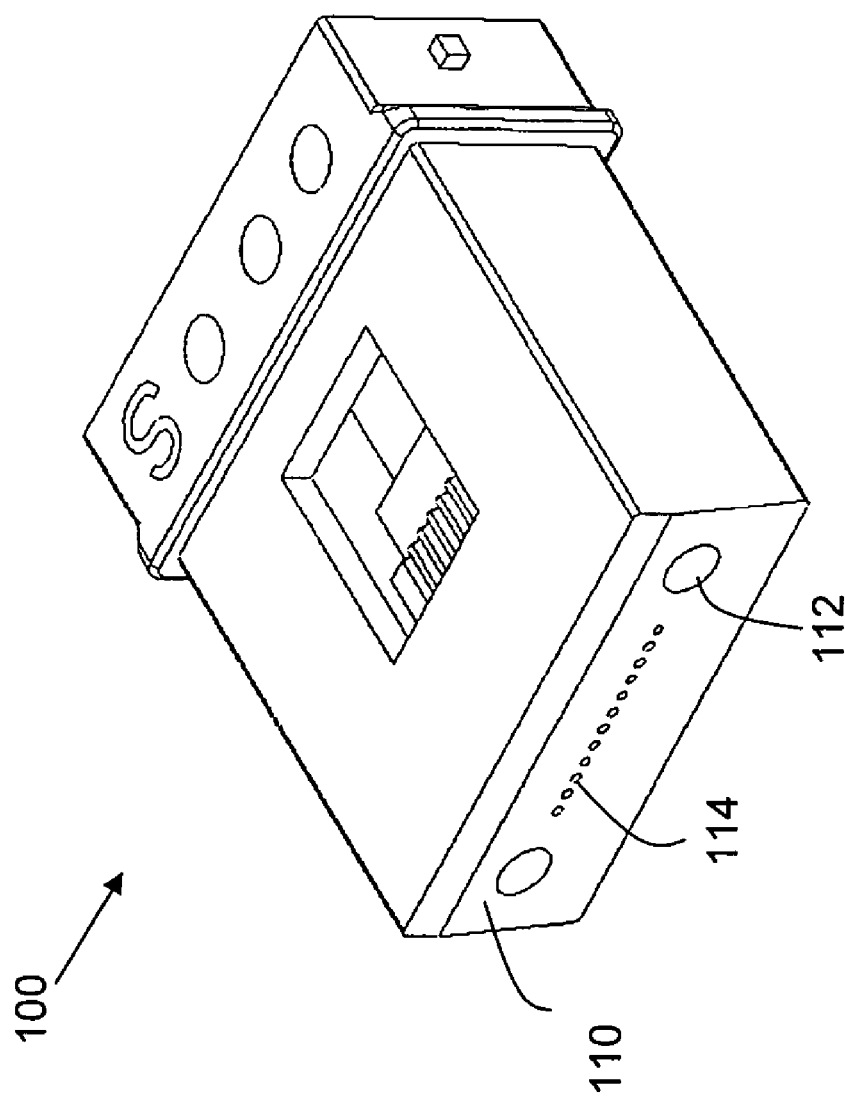
FIG. 1 is a sketch of a prior art multi-fiber ferrule.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 shows a multi-fiber ferrule 100, as is known in the art. Ferrule 100 has a mating face 110. Mating face 110 includes alignment features, such as holes 112. Fiber ends project through holes 114, that are precisely positioned relative to alignment holes 112. In operation, ferrule 100 would be held within a connector. That connector would mate with another connector that included a similar ferrule. However, the mating connector would have complementary mating features. For example a mating ferrule might have alignment posts in place of holes 112.

FIG. 2 shows a ferrule carrier assembly 200. In use, a ferrule can be incorporated into a ferrule carrier assembly 200 for easy application into an optical connector. FIG. 2 shows an example of a ferrule mounted in a ferrule carrier.

As shown in FIG. 2, ferrule 210 has a mating face 212. Alignment features in mating face 210 include a hole 214 and a post 216. Ferrule 210 may mate with a similarly shaped ferrule, with the post of one ferrule aligning with the hole of the other. As with ferrule 100, ends of optical fibers are positioned in the mating face of ferrule 210 relative to the alignment features.

Ferrule carrier 200 includes a support member 220. Support member 220 might be in the shape of a frame or other suitable support.

Compliant member 222 is mounted to support member 220. Preferably, the ferrule will have compliance relative to the support member 220. Compliance ensures that, as two optical fiber connectors are pressed together for mating, the alignment features determine the final alignment of the ferrules. Compliance automatically corrects for misalignment of the connectors.

In FIG. 2, compliance is provided through a spring coupling (not numbered) between compliant member 222 and support member 220.

Support member 220 also includes attachment features that can hold the ferrule carrier 200 in a housing. In the example of FIG. 2, the attachment features are shown as latches 224 on cantilevered beams extending from the support member.

Cantilevered beams include handles 226 that may be pressed to flex the cantilevered beams and release the latches 224 from a housing. Handles 226 also provide a convenient manner for a user to grasp ferrule carrier 200 when assembling or disassembling a connector.

An optical fiber bundle 250 extends from the rear of ferrule carrier 200. In the case of a multifiber ferrule, optical fiber bundle 250 contains multiple fibers encased in a protective covering.

FIG. 3 shows a connector 300 incorporating ferrule carrier 200. Connector 300 includes a housing that has an outer shell 310. In this example, outer shell 310 is tubular and sized to receive a single ferrule carrier 200. Embodiments in which the outer shell receives multiple ferrule carriers are also possible.

Outer shell 310 includes features that receive latches 224, here a slot 312.

The housing of connector 300 also includes an inner shell 322. Inner shell 322 fits within outer shell 310 and may slide relative to outer shell 310. Spring 324 biases inner shell 322 forward.

When two connectors mate, mating faces 326 of the connectors press against each other. The pressure causes inner shell 322 to be retract into outer shell 310.

Inner shell 322 includes a door assembly 330. Door assembly 330 contains one or more retractable doors (not numbered) that normally cover mating face 326. When inner shell 310 retracts into outer shell 310, the doors are actuated to swing open. In this way, the mating faces of the ferrules are protected, but are exposed for mating when the connectors are pressed together.

Figure 4:
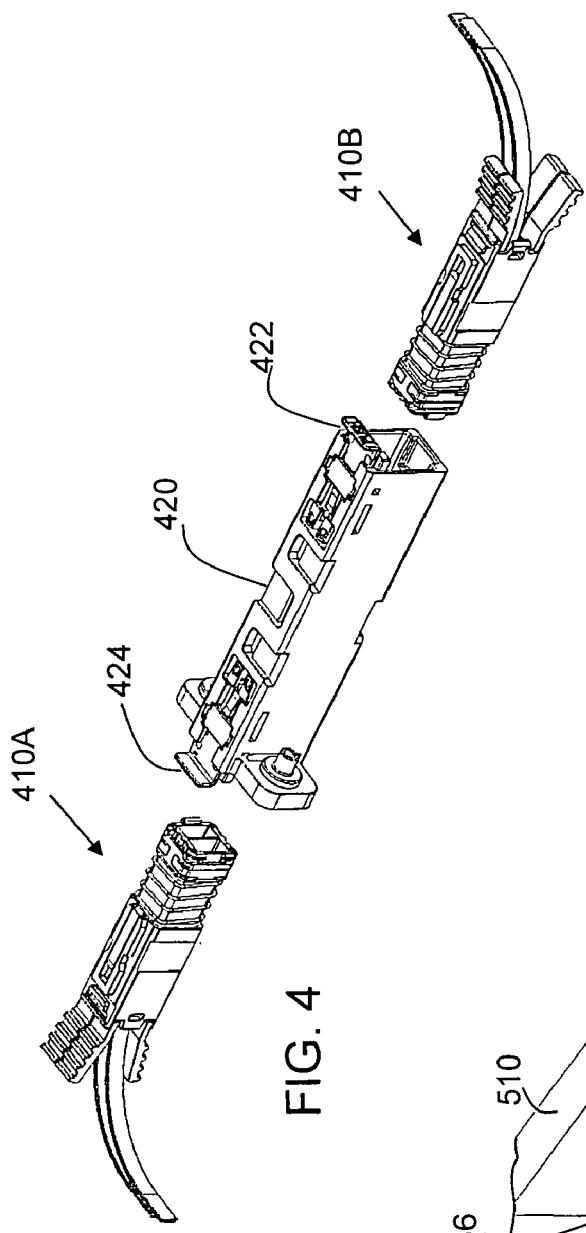
FIG. 4 is a sketch of an adapter, such as might be used in a panel configuration, for aligning two optical connectors.

FIG. 4 shows a connector assembly, including two connectors, 410A and 410B. Alignment of connectors 410A and 410B is achieved in a panel adapter 420. Here, connectors 410A and 410B are duplex connectors, meaning that each contains two ferrule carriers, such as ferrule carrier 200 (FIG. 2).

Adapter 420 aligns connectors 410A and 410B so that they will properly mate. Adapter 420 also includes latching features 422 and 424 to latch the connectors in place when mated.

Figure 5:
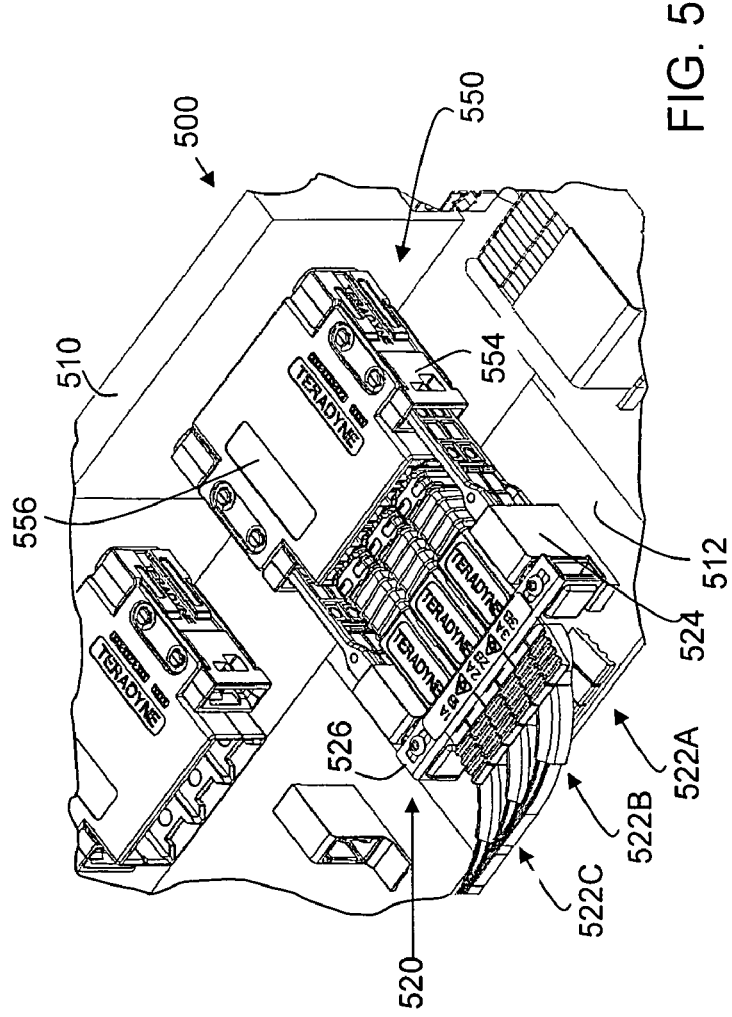
FIG. 5 is a sketch of an adapter, such as might be used in a backplane configuration, for aligning multiple optical connectors.

FIG. 5 shows an alternative configuration of a connector assembly. FIG. 5 shows a backplane connector assembly 500. Daughter card connector 520 is mounted to a daughtercard 512. Backplane connector 550 is mounted to backplane 510.

Daughter card connector 520 contains multiple connectors 522A, 522B and 522C. Also, latching modules 524 engage complementary latching modules 554 that are part of backplane connector 550. Engagement between latching modules 524 and 554 holds the connectors together when mated.

Daughter card connector 520 includes a support member 526. Here, an elongated metal member having openings to receive individual connectors provides a base to which the components of the connector can be attached.

Backplane connector 550 also includes a support member. Here, a housing 556 provides a base to which components of the connector can be attached. Housing 556 has multiple channels formed in it. Individual connectors, such as 410A and 410B, can be mounted inside the channels in housing 556. The channels also receive connectors 522A, 522B and 522C of daughter card connector 520. Housing 556 aligns the individual connectors for mating.

Connector assemblies shown in FIGS. 3, 4 and 5 are described for use with multifiber ferrules in the above referenced patent applications. These assemblies contain substantial numbers of components in addition to a ferrule and the ferrule holder. Housings are needed to hold the ferrule carriers. Adapters are used with the connectors. And, as part of a connector assembly, latching must be provided.

FIG. 6 shows a single fiber ferrule, as is known in the art. It would be desirable to have a fiber optic connector assembly like those shown above that could be used for single fiber ferrules. A manufacturer or seller of optical fiber assemblies would achieve significant advantages if connector assemblies for single fiber ferrules could be assembled with the same pieces as used to make connector assemblies for multifiber ferrules.

Single fiber ferrule 600 has a mating face 610. Cylindrical portion 612 is a precision component. A fiber end is exposed in the mating face at a location precisely positioned relative to the outer surfaces of cylindrical portion 612. When two ferrules, such as ferrule 600 mate, they are held together in a sleeve that aligns the outer surface of cylindrical portion 612, which also aligns the fibers.

Block 614 aids in connection of the ferrule to a connector. The fiber projects from rear surface 616. The fiber is usually enclosed in a protective sheath.

FIG. 7 shows two single fiber ferrules 600 assembled into a ferrule carrier assembly 700.

Ferrule carrier assembly 700 contains a support member 720. Support member 720 preferably has the same exterior dimensions as ferrule carrier assembly 200 (FIG. 2). Support member 720 has latches 724 positioned similarly and serving the same function as latches 224. Also, handles 726 are positioned similarly and serve the same function as handles 226. And, as with ferrule carrier assembly 200, the mating faces of the ferrules are exposed at a forward end of the ferrule carrier assembly.

Optical fibers are not shown in FIG. 7. However, the mating faces 610 of the ferrules are visible. As in FIG. 6, the fiber is preferably positioned in the center of the mating faces. Also, boots 750A and 750B are shown. In a completed assembly, optical fiber would extend through the boots. The boots protect the fiber and aid in attachment of the fiber to the ferrule carrier assembly.

Support member 720 also includes attachment features such as 730. Attachment features provide a place to attach a cap to ferrule carrier assembly 700. As will be described in greater detail below, the ability to attach a cap provides several advantages that allows a ferrule carrier assembly to be used for many applications.

Figure 8:
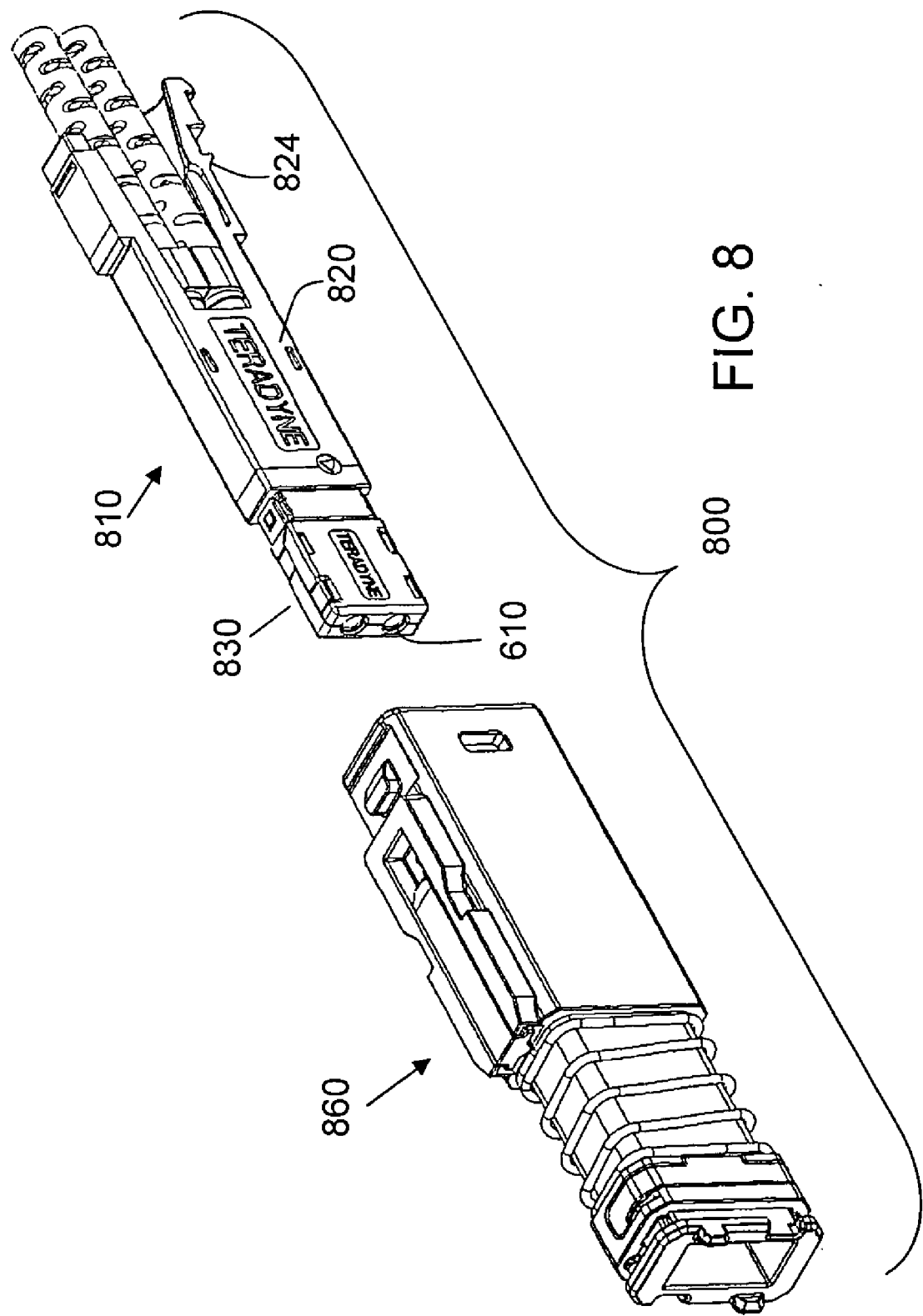
FIG. 8 is a sketch of a ferrule carrier for single fiber ferrules and a housing.

FIG. 8 shows a connector assembly 800. Connector assembly 800 includes a single fiber ferrule carrier 810, similar to the one shown in FIG. 7. Connector assembly 800 also includes a connector housing 860, similar to the housings shown for the connectors of FIGS. 3, 4 and 5. Ferrule carrier 810 is inserted into housing 860. Because of the design of ferrule carrier 810, the same housing 860 can be used for ferrule carrier 810, carrying single fiber ferrules, or ferrule carrier 200, carrying a multifiber ferrule. For example, single fiber ferrule carrier 810 includes latching features, such as latches 824 that operate similarly to the latching features 224 on multifiber ferrule carriers.

A further reason that single fiber ferrule carrier is operable in housing 860 is that alignment features normally found in an adapter used to mate connectors with single fiber ferrules have been incorporated into ferrule carrier 810. Cap 830 contains alignment sleeves normally contained within a single fiber ferrule adapter.

In the preferred embodiment, cap 830 is made as a separate piece from support member 820. Only one alignment sleeve is needed for each pair of mating ferrules. Therefore, only one cap is needed for two ferrule carriers. By constructing the cap containing the alignment sleeves as a separate component, the same support member can be used for all single fiber ferrule carriers in the connector assembly. Cap 830 can then be attached to support 820.

Figure 9:
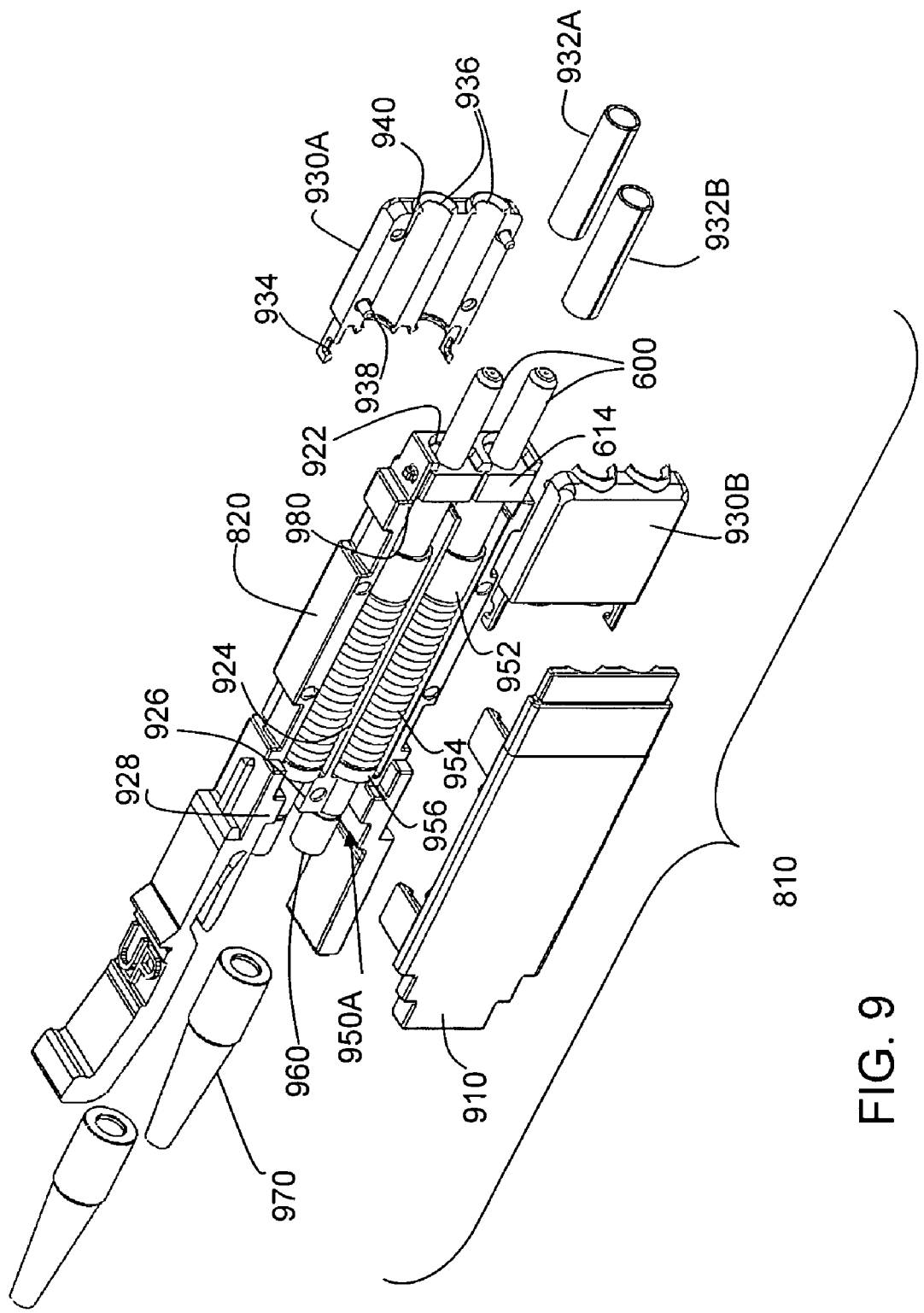
FIG. 9 is an exploded view of the ferrule carrier of FIG. 8.

FIG. 9 shows an exploded view of single fiber ferrule carrier 810. Cover 910 engages with support 820. With cover 910 removed, a cavity in the interior of support 820 is accessible. Ferrule assemblies are inserted into this cavity. Here, two ferrule assemblies are shown, with ferrule assembly 950A being numbered.

Ferrule assembly 950A includes a ferrule 600. Ferrule 600 is inserted through an opening 922 in the mating face of support 820. Block 614 does not fit through opening 922, thereby retaining ferrule 600 within carrier 810. Support 820 includes a channel 980 into which block 614 fits. In this way, the ferrule can slide, over at least a certain range of motion within support 820. This range of motion is important to provide compliance as connectors mate.

Cylindrical ring 952 surrounds the fiber to the rear of block 614. Spring 954 surrounds the optical fiber. The forward end of spring 954 presses against ring 952. A similar ring 956 surrounds the fiber to the rear of spring 954.

During installation of ferrule assembly 950A in ferrule carrier 810, spring 954 is compressed, allowing ring 956 to move forward of abutments 926 and 928 in the cavity of support 820. When spring 954 is released, the spring force will cause ring 956 to press against abutments 926 and 928. Likewise, ring 952 will press against block 614, ensuring that it is biased forwards in the connector. However, spring 954 allows sufficient compliance to take up for any mismatch in ferrule positioning when ferrules in two connectors are mated.

The rearward portion of ferrule assembly 950A includes a crimp ring, such as crimp ring 960. Crimp ring 960 holds a protective sheath to the cable. Boot 970 fits over the fiber and crimp ring 960. Boot 970 protects the fiber, such as by preventing it from being bent into too tight a curve.

Rib 924 provides a channel to ensure that spring 954 stays positioned.

FIG. 9 also shows cap 830 in greater detail. In the preferred embodiment, cap 830 is made of two identical shell pieces 930A and 930B that snap together. When snapped together and installed on a support member, openings 934 surround an attachment feature such as feature 730 (FIG. 7). However, the precise method of attachment is not critical. Latching, friction or interference fit might be used. Additionally, permanent forms of attachment might be used, attachment methods using glue or heat fusion might be used. Also, though making the cap as a separable piece is desirable for many applications, it could be integrally formed with support 820.

Shell pieces 930A and 930B include latching structures such as posts 938 and holes 940 that hold the shell pieces together. The precise form of attachment of shell pieces 930A and 930B is also not critical. The pieces could be joined in a separable or permanent method. Also, it is possible that cap 830 could be made as a single piece.

Each shell piece 930A and 930B includes channels 936. When the shell pieces 930A and 930B are connected together, alignment sleeves 932A and 932B are held within the channels 936. Alignment sleeves are held adjacent the openings 822 in the mating face of ferrule carrier 810. In this way, each of the ferrules 600 will enter one of the alignment sleeves 932A or 932B.

In the preferred embodiment, alignment sleeves 932A and 932B are alignment sleeves as are generally used in adapters for single fiber ferrules. They can be made of material such as brass or ceramic. The also contain a split along their long axis to allow for a precise fit around a ferrule.

The material used to form support 820 and cap 830 is not critical. These components could, for example, be molded of plastic.

Figure 10:
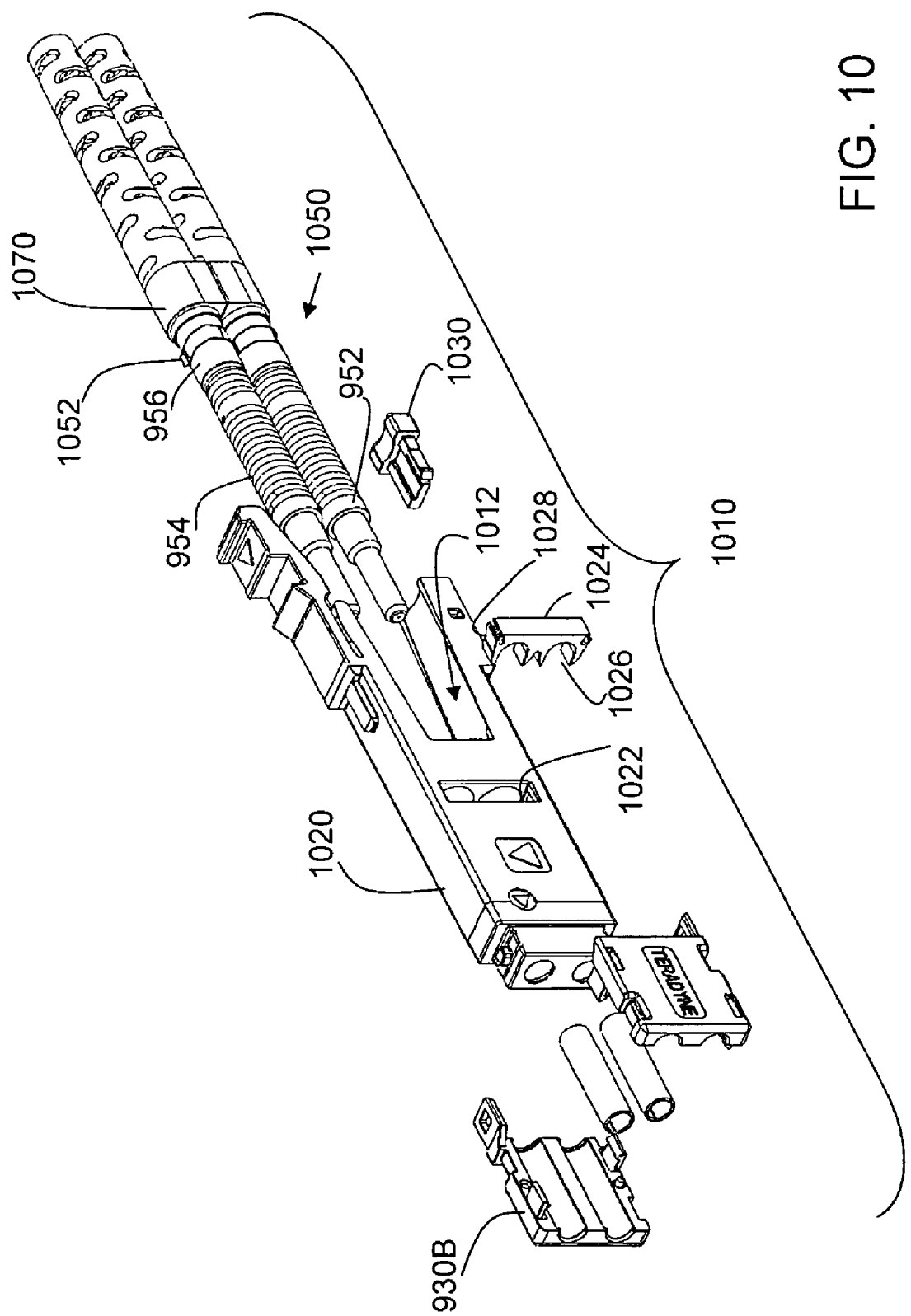
FIG. 10 is an exploded view of the ferrule carrier of FIG. 9 shown from a reverse angle.

FIG. 10 shows an alternative implementation of a ferrule carrier for single fiber ferrules. Single fiber ferrule carrier 1010 includes a support 1020. Support 1020 is adapted to receive a ferrule assembly 1050, that includes two ferrules in one assembly.

As in the embodiment of FIG. 9, each of the ferrules has a fiber running to it. Also, a forward ring 952, a spring 954 and a rearward ring 956 are provided around each fiber.

In the embodiment of FIG. 10, the ferrule assembly is inserted from the rear of the ferrule carrier. Rather than having a removable side, such as 910 (FIG. 9), support 1020 has an rearward opening 1012 into an interior cavity sized to receive the ferrule assembly 1050. To secure ferrule assembly 1050 in support 1020, clip 1024 is used.

Clip 1024 has curved portions 1026 that conform to the shape of ferrule assembly 1050 at locations 1052. Clip 1024 fits through window 1022 in support 1020 and has latching features that hold it in the window once inserted.

To install ferrule assembly 1050 into support 1020, ferrule assembly 1050 is pressed forward into support 1020 until location 1052 is visible through window 1022. Clip 1024 is then inserted through the window, engaging the ferrule assembly 1050 at location 1052, which is rearward of ring 956. Clip 1024 therefore precludes the ferrule assembly from being removed from support 1020. However, the ferrules 600 may still exhibit compliant motion by compression of springs 954.

Clip 1024 has latching features 1028 that hold it in support 1020 once installed. An alternative embodiment to facilitate removal of clip 1024 would be to make the clip with non-latching shoulders in place of latching features 1028. To secure the clip, window 1022 would have two regions. The first region would be sized to receive the entire clip 1024. The second region would be positioned to the rear of the first region. This region would be partially closed off with overhangs. These overhangs would be sized to project over the shoulder regions of the clip. Thus, the clip could be inserted into the first region and then slid rearward into the second region. Once in the second region, the overhanging portions would prevent the clip from being pulled out from the side. Because, in operation, spring 954 presses clip 1024 to the rear, force from spring 954 would keep clip in the second region once the ferrule carrier was assembled.

With the alternative embodiment, the clip could be removed by pressing the ferrule assembly 1050 forward in support 1020. Pressing the ferrule assembly forward would relieve the force on the clip and allow it to slide forward into the first region, where it could be removed from the side. Various tools might be used to aid in the removal of the clip. One possibility is that the clip could be made of a magnetic material, such as magnetic stainless. A magnet placed to the side of the ferrule carrier would remove the clip once the force from springs 954 was removed.

FIG. 10 also shows that an identifying chip 1030 may be inserted into support 1020. The use of chips that can be inserted and removed from connectors to provide easy visual identification of components is described more fully in our co-pending U.S. patent application Ser. No. 10/7845,475, Publication No. 2005/0135752, entitled "Fiber Optic Bulkhead Connector" filed on the same date as the present application, which is incorporated herein by reference.

Figure 11:
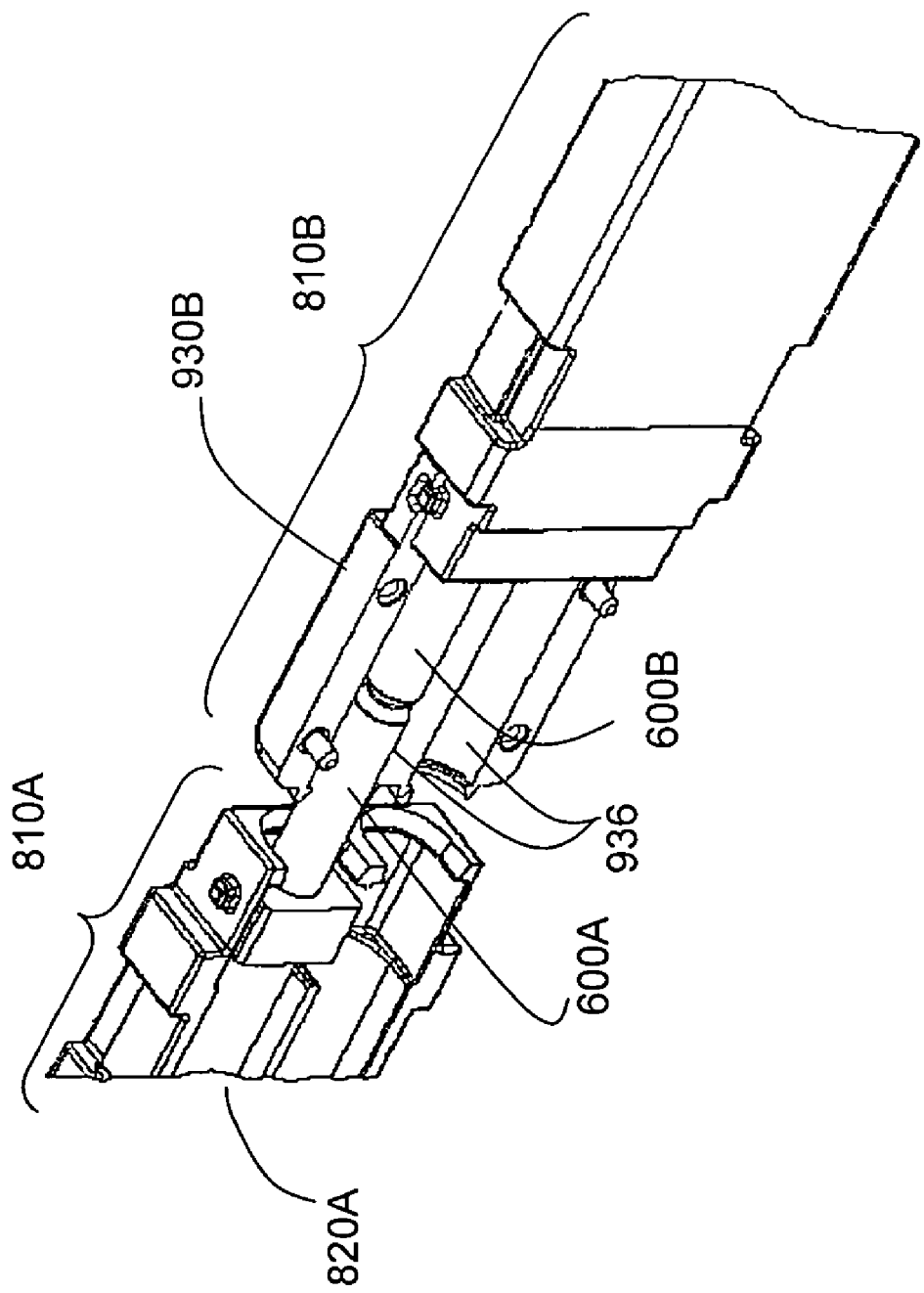
FIG. 11 is an view of the interior alignment of single mode fibers using ferrule carriers as shown in FIG. 8.

FIG. 11 shows the mating configuration of portions of two single fiber ferrule carriers. In the preferred embodiment, the ferrule carriers would be inserted in connectors, such as is shown in FIG. 3. The connectors would likely then be held within an adapter. The shell portions, such as 310 and the adapter are not shown in FIG. 11 for clarity. However, a suitable adapter is described in our co-pending U.S. patent application Ser. No. 10/7845,475, Publication No. 2005/0135752, entitled "Fiber Optic Bulkhead Connector" filed on the same date as the present application, which is incorporated by reference herein.

Portions of ferrule carriers 810A and 810B. One shell piece 930B of cap 830 is shown attached to ferrule carrier 810B. Support 820A of a ferrule carrier 810A is shown. Ferrule carrier 810A does not include a cap 830 because only one such cap is required to align a pair of ferrule carriers.

As can be seen, ferrules 600A and 600B are aligned within channels 936. Alignment sleeves 932A or 932B are not shown. However, they would be present in a preferred embodiment and would surround the mating interfaces of the ferrules within the channels 936.

The optical connection system described above has a modular design that simplifies the manufacture of optical interconnection systems. The carrier for single fiber ferrules can be assembled into an optical interconnection system using the same components as a multi-fiber ferrule connector. This feature allows a manufacturer or distributor of interconnection components to have a smaller number of component types that are each more widely used. There is an advantage to using many copies of one component type rather than needing to make a smaller number of more component types.

Also, this compatibility allows a system to be designed for single fiber ferrule interconnects but upgraded to ferrules with more fibers if need changes. This upgrade can be performed by changing only the ferrule carrier, leaving the rest of the connector assembly, including adapters, latching members, etc. intact.

Modularity of design is also employed in single fiber ferrule carriers. Even though only one ferrule carrier in a mating pair requires alignment features, the same basic design for each ferrule carrier can be used. A cap, which can be made as a separate module, can be added to one of the carriers to incorporate the alignment features.

Having alignment features on the ferrule carriers means that no ferrule specific alignment features are required in an adapter. This feature has the further advantage of promoting modularity of the overall connector system. Changes in the specific ferrule design do not require changes in the adapter or other portions of the interconnection system except the ferrule carrier.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention.

For example, a ferrule carrier is described as suitable for use with cylindrical ferrules. Such a ferrule carrier has round openings in a support member that generally match the outline of the ferrule. It is not necessary either that the ferrules used be cylindrical, that the openings through which the ferrule face is exposed are round or that the openings match the outline of the ferrule. The ferrule carrier might have a U-shaped section that provides support but still provides an opening through which the face of the ferrule is accessible while still providing support. Alternatively, ferrule carrier might employ a rigid sheet or beam with the ferrule mounted to it. Accordingly, many different shapes for support members may be used.

Accordingly, the foregoing description and drawings are by way of example only.

What is claimed is:

1. A ferrule carrier, comprising:
    a) a support member having a forward member with an opening therethrough;
    b) a ferrule having a forward face and a rearward face and an outer surface, the forward face positioned in the opening, the ferrule slidably mounted to the support member;
    c) an optical fiber extending from the rearward face of the ferrule;
    d) a cap attached to the support member;
    e) an alignment member held within the cap adjacent the opening, the alignment member having an inner surface conforming to the outer surface of the ferrule, the alignment member aligned with the ferrule; and
    f) a spring having a first end coupled to the ferrule and a second end coupled to the support member,
    wherein the support member has a forward end and wherein the alignment member abuts the forward end.

2. The ferrule carrier of claim 1 wherein the ferrule is cylindrical.

3. The ferrule carrier of claim 1 wherein the alignment member is a split tube.

4. The ferrule carrier of claim 1 wherein the cap is removably attached to the support member.

5. The ferrule carrier of claim 3 wherein the tube comprises a material consisting of one of ceramic and bronze.

6. The ferrule carrier of claim 1 additionally comprising a latch to hold the cap to the support member.

7. The ferrule carrier of claim 1 assembled into a connector; the connector having a housing and the ferrule carrier is removably engaged within the housing.

8. The ferrule carrier of claim 1, wherein the ferrule has a longitudinal axis and is slidably mounted to the support to permit the ferrule to slide along its longitudinal axis.

9. An optical fiber connector using the ferrule carrier of claim 1, further comprising a housing and wherein the ferrule carrier is removably attached to the housing.

10. An optical fiber connector assembly using the optical fiber connector of claim 9, further comprising an adapter, wherein the housing is removably attached to the adapter, and wherein the adapter does not contain ferrule alignment features.

11. A ferrule carrier, comprising:
    a) a support member having a forward member with an opening therethrough;
    b) a ferrule having a forward face and a rearward face and an outer surface, the forward face positioned in the opening, the ferrule slidably mounted to the support member;
    c) an optical fiber extending from the rearward face of the ferrule;
    d) a cap attached to the support member; and
    e) an alignment member held within the cap adjacent the opening, the alignment member having an inner surface conforming to the outer surface of the ferrule, the alignment member aligned with the ferrule,
    wherein the ferrule carrier is assembled into a connector having a housing with at least one swinging door, and wherein the ferrule carrier is removably engaged within the housing.

12. The ferrule carrier of claim 11 wherein the first ferrule and the second ferrule are cylindrical.

13. The ferrule carrier of claim 12 wherein the tube comprises a material consisting of one of ceramic and bronze.

14. The ferrule carrier of claim 11 wherein the first connector and the second connector each additionally comprises a spring having a first end coupled to the ferrule and a second end coupled to the support.

15. An optical connector assembly comprising:
a) a first connector having a first ferrule carrier comprising:
  i) a first support having a forward member with a first opening;
  ii) a first ferrule having a forward face and a rearward face and an outer surface, the first ferrule slidably mounted to the support;
  iii) a first optical fiber extending from the rearward face of the ferrule;
  iv) a cap attached to the first support;
  v) an alignment member held within the cap adjacent the first opening, the alignment member having an inner surface conforming to the outer surface of the first ferrule, the alignment member aligned with the first ferrule;
  vi) a spring having a first end coupled to the ferrule and a second end coupled to the support member,
  wherein the first support has a forward end and wherein the alignment member abuts the forward end;
b) a second connector having a second ferrule carrier comprising:
  i) a second support having a forward member with a second opening;
  ii) a second ferrule having a forward face and a rearward face and an outer surface, the second ferrule slidably mounted to the second support;
  iii) a second optical fiber extending from the rearward face of the ferrule; and,
c) wherein the first connector and the second connector are aligned with the forward faces of the first ferrule and the second ferrule disposed within the alignment member.

16. The ferrule carrier of claim 15 wherein the alignment member is a tube.

17. A ferrule carrier, comprising:
a) a support member having a forward member with an opening therethrough;
b) a ferrule having a forward face and a rearward face and an outer surface, the forward face positioned in the opening, the ferrule slidably mounted to the support member;
c) an optical fiber extending from the rearward face of the ferrule;
d) a cap attached to the support member; and
e) an alignment member held within the cap adjacent the opening, the alignment member having an inner surface conforming to the outer surface of the ferrule, the alignment member aligned with the ferrule,
wherein the support member has a side surface with a window therein, the ferrule carrier further comprising a clip mounted within the window of the side surface and engaging the ferrule.

18. The ferrule of claim 17, wherein the clip is removably mounted within the window to engage the ferrule to the support member.

19. A ferrule carrier, comprising:
a) a support member having a forward member with an opening therethrough;
b) a ferrule having a forward face and a rearward face and an outer surface, the forward face positioned in the opening, the ferrule slidably mounted to the support member;
c) an optical fiber extending from the rearward face of the ferrule;
d) a cap attached to the support member; and
e) an alignment member held within the cap adjacent the opening, the alignment member having an inner surface conforming to the outer surface of the ferrule, the alignment member aligned with the ferrule,
wherein the cap has an opening for receiving another ferrule, wherein the opening is smaller than the alignment member.

* * * * *